US008107258B2

(12) United States Patent  
Chang

(10) Patent No.: US 8,107,258 B2
(45) Date of Patent: Jan. 31, 2012

(54) STORAGE CARD LOCK AND PORTABLE ELECTRONIC DEVICE USING THE SAME

(75) Inventor: Cheng-Lung Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 315 days.

(21) Appl. No.: 12/618,085

(22) Filed: Nov. 13, 2009

(65) Prior Publication Data

US 2010/0284157 A1 Nov. 11, 2010

(30) Foreign Application Priority Data

May 5, 2009 (CN) .......................... 2009 1 0302106

(51) Int. Cl.
*H05K 7/14* (2006.01)
*H05K 7/18* (2006.01)

(52) U.S. Cl. .................. 361/801; 361/802; 361/759

(58) Field of Classification Search .................. 361/727, 361/737, 756, 759, 801–803, 747; 439/55, 439/59, 153, 159; 235/472.01, 486, 492, 235/380; 455/575.01–575.03
See application file for complete search history.

(56) References Cited

U.S. PATENT DOCUMENTS

| | | | | |
|---|---|---|---|---|
| 6,543,696 | B2 * | 4/2003 | Nishimura | 235/472.01 |
| 6,766,952 | B2 * | 7/2004 | Luu | 235/451 |
| 7,374,440 | B2 * | 5/2008 | Chen et al. | 439/159 |
| 7,661,971 | B1 * | 2/2010 | Abe | 439/159 |
| 7,780,090 | B2 * | 8/2010 | Long et al. | 235/486 |
| 7,823,790 | B1 * | 11/2010 | Valenzuela et al. | 235/486 |
| 7,990,729 | B2 * | 8/2011 | Lu | 361/747 |

* cited by examiner

*Primary Examiner* — Hung S Bui
(74) *Attorney, Agent, or Firm* — Altis Law Group, Inc.

(57) ABSTRACT

A storage card lock is used in a portable electronic device including a body, a battery, and a storage card. The body includes a battery bay and a storage card bay disposed thereon adjacent to each other. The storage card lock is detachably mounted on the body and includes an elastic lock piece. The elastic lock piece is partially accommodated within the battery bay and impelled by the battery to fix the storage card within the storage card bay.

15 Claims, 5 Drawing Sheets

STORAGE CARD LOCK AND PORTABLE ELECTRONIC DEVICE USING THE SAME

BACKGROUND

1. Technical Field

The exemplary disclosure generally relates to a storage card lock and a portable electronic device using the storage card lock.

2. Description of Related Art

With the development of wireless technology, portable electronic devices such as mobile phones, personal digital assistants (PDAs), etc. are becoming widely used and multifunctional. These portable electronic devices typically use storage cards, such as SIM, SD, CF cards, and others, for storing usable information.

Often, the portable electronic device defines a storage card bay for receiving a storage card therein. For maximum integrity of installation a storage card lock fixes the storage card in the bay. However, such storage card locks have a complicated structure and occupy considerable space within the portable electronic device.

Therefore, there is room for improvement within the art.

BRIEF DESCRIPTION OF THE DRAWINGS

Many aspects of the exemplary storage card lock and portable electronic device using the same can be better understood with reference to the following drawings. These drawings are not necessarily drawn to scale, the emphasis instead being placed upon clearly illustrating the principles of the present storage card lock and portable electronic device using the same. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
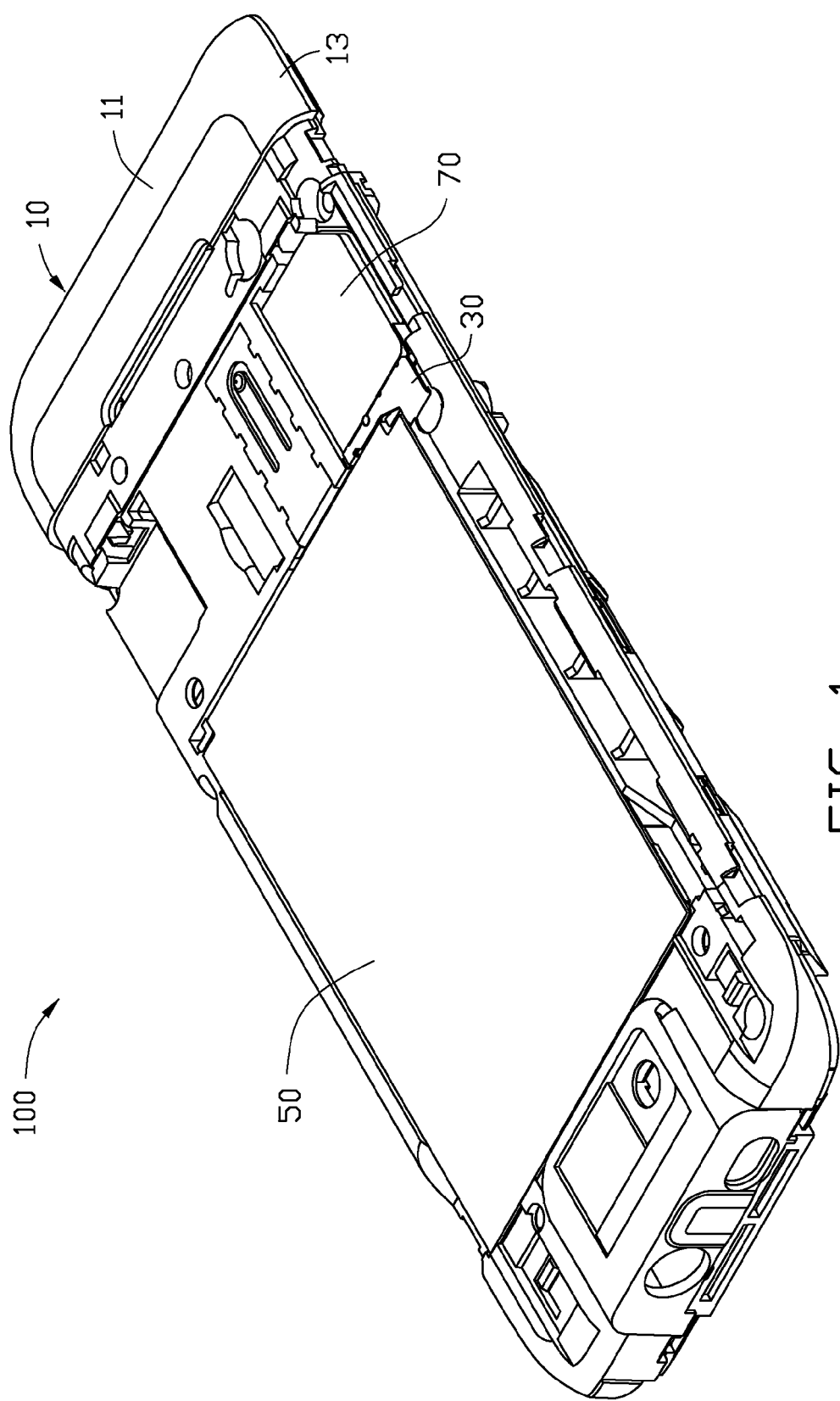
FIG. 1 is a perspective view of a portable electronic device with a storage card lock according to an exemplary embodiment.
Figure 2:
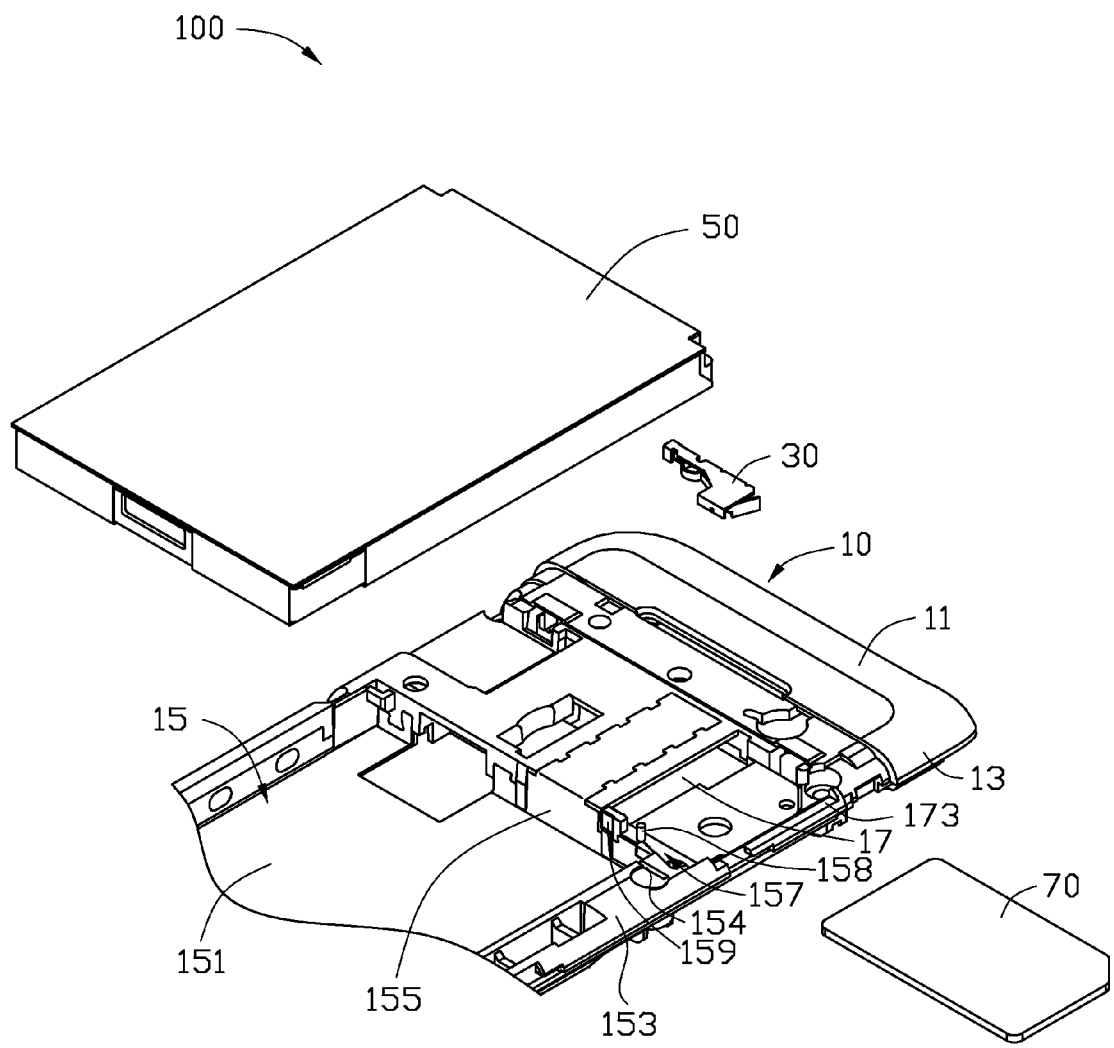
FIG. 2 is an exploded, perspective view of the portable electronic device of FIG. 1.

FIG. 1 is a perspective view of a portable electronic device with a storage card lock according to an exemplary embodiment, with a storage card lock 30 thereon fixing a storage card 70 received in the portable electronic device 100, according to an exemplary embodiment. FIG. 2 is an exploded, perspective view of the portable electronic device of FIG. 1, including a main body 10, a storage card lock 30, a battery 50 and a storage card 70. The main body 10 can be a back shell of the portable electronic device 100, and includes an upper surface 11, a side portion 13, a battery bay 15 and a storage card bay 17. The battery bay 15 and the storage card bay 17 are disposed on the main body 10, adjacent to each other.

The battery bay 15 is a chamber recessed in the upper surface 11 of the main body 10, forming a bottom wall 151, two spaced disposed first sidewalls 153, and two spaced disposed second sidewalls 155. One first sidewall 153 defines a latching slot 154 recessed therein adjacent to the storage card bay 17 from the upper surface 11. The second sidewall 155 includes a gap 157 defined therethrough, and a positioning post 158. The gap 157 is adjacent to the latching slot 154, and communicates with the storage card bay 17. The positioning post 158 is disposed within the gap 157. Two sides of the second sidewall 155 adjacent to the gap 157 are recessed toward each other to form a latching portion 159. It is to be understood that the latching slot 154 can also be recessed directly in the side portion 13 of the main body adjacent to the storage card bay 17.

The storage card bay 17 is disposed adjacent to the second sidewall 155 of the battery bay 15. The storage card bay 17 is a groove recessed in the side portion 13 of the main body 10. The storage card bay 17 includes an access opening 173 formed on the side portion 14 receiving the storage card 70 therethrough. One end of the storage card bay 17 adjacent to the access opening 173 defines an opening (not shown) communicating with the exterior of the main body 10, through which the storage card 70 can be easily removed.

Figure 3:
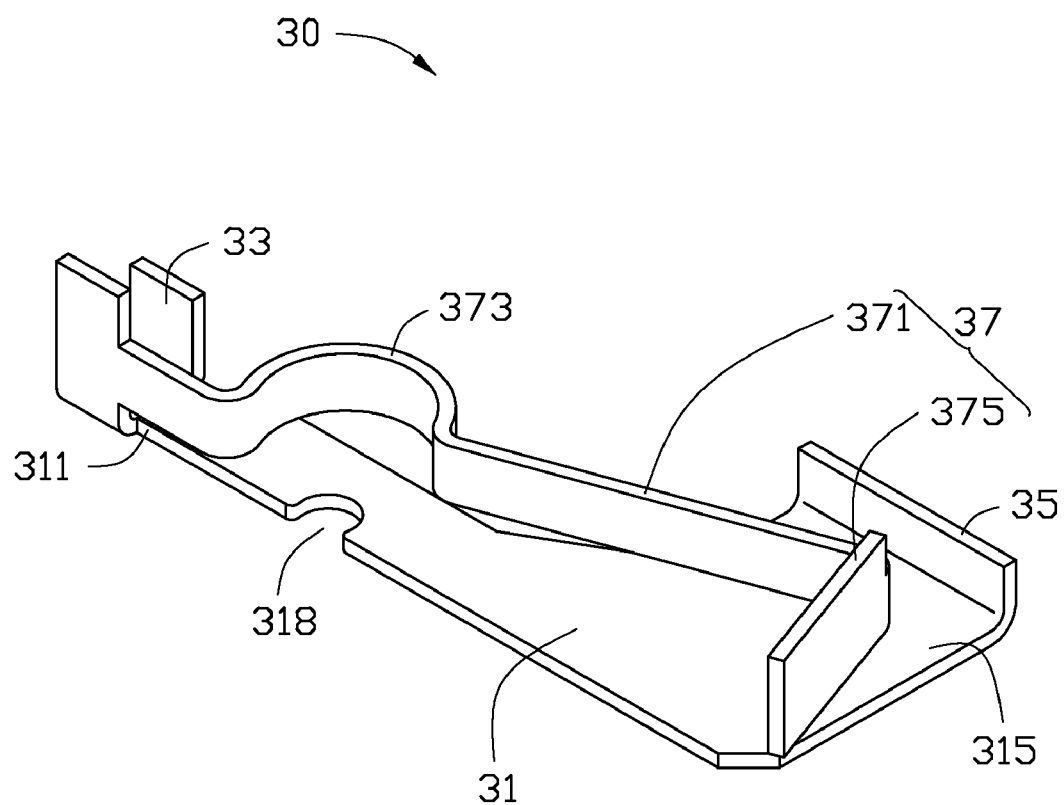
FIG. 3 is a perspective view of a storage card lock according to an exemplary embodiment.

FIG. 3 is a perspective view of a storage card lock 30 according to an exemplary embodiment, received in the second sidewall 155 of the main body 10, fixing and releasing the storage card 70 received within the storage card bay 17. In the exemplary embodiment, the storage card lock 30, a punched and bent sheet of metallic material, includes a body portion 31, two latching arms 33, a fixing portion 35 and an elastic lock piece 37. The body portion 31 is a substantially L-shaped, and includes a latching end 311 and a fixing end 315. The body portion 31 defines a notch 318 therethrough adjacent to the latching end 311 and an edge of the body portion 31, corresponding to the positioning post 158 of the main body 10. The two latching arms 33 are disposed at two sides of the latching end 311 of the body portion 31 corresponding to the latching portion 159 of the second sidewall 155. In the exemplary embodiment, the two latching arms 33 extend outward from opposite edges of the latching end 311 and are bent toward each other to form a substantially U-shaped latching portion. A distance between the two latching arms 33 is substantially the same as the width of the latching portion 159 of the second sidewall 155. The fixing portion 35 is a substantially rectangular sheet and is disposed at the fixing end 315 of the body portion 31 parallel to the latching arms 33. The fixing portion 35 extends from the fixing end 315 and is bent toward the latching arms 33.

The elastic lock piece 37 is a substantially L-shaped extending and bending from the latching end 311 toward the fixing portion 35. The elastic lock piece 37 includes an elastic releasing body 371 and a lock portion 375. The elastic releasing body 371 extends outward from the latching arm 33 of the latching end 311. The elastic releasing body 371 adjacent to the latching arm 33 is bent to form a curved releasing portion 373 corresponding to the notch 318 of the body portion 31. The lock portion 375 is a substantially rectangular and disposed at the distal end of the elastic releasing body 371. The lock portion 375 extends from the distal end of the elastic releasing body 371 and is bent away from the fixing portion 35 and perpendicular to the releasing body 371.

Figure 4:
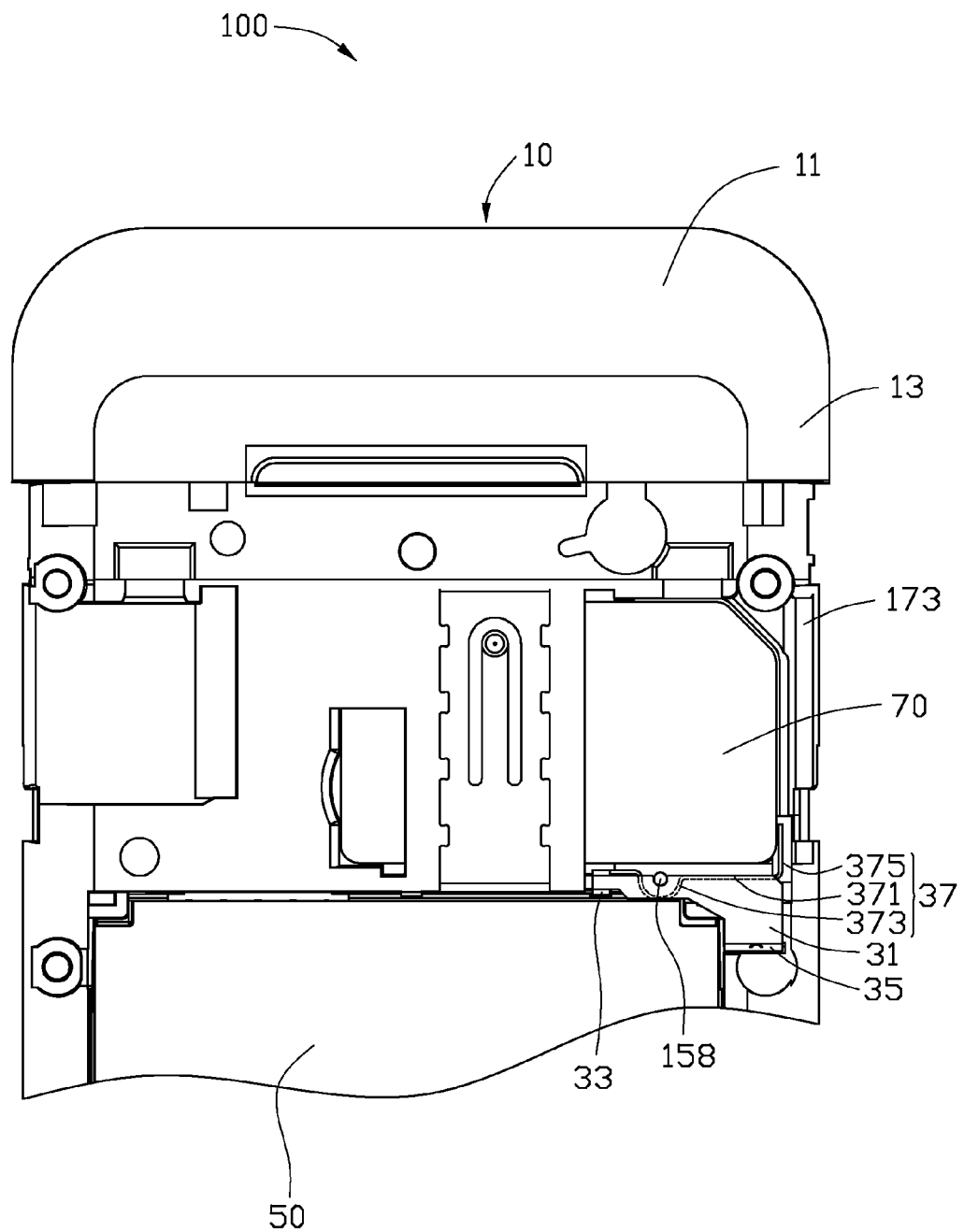
FIG. 4 is a top view of the portable electronic device of FIG. 1, with a storage card received and locked within the storage card bay thereof, according to an exemplary embodiment.
Figure 5:
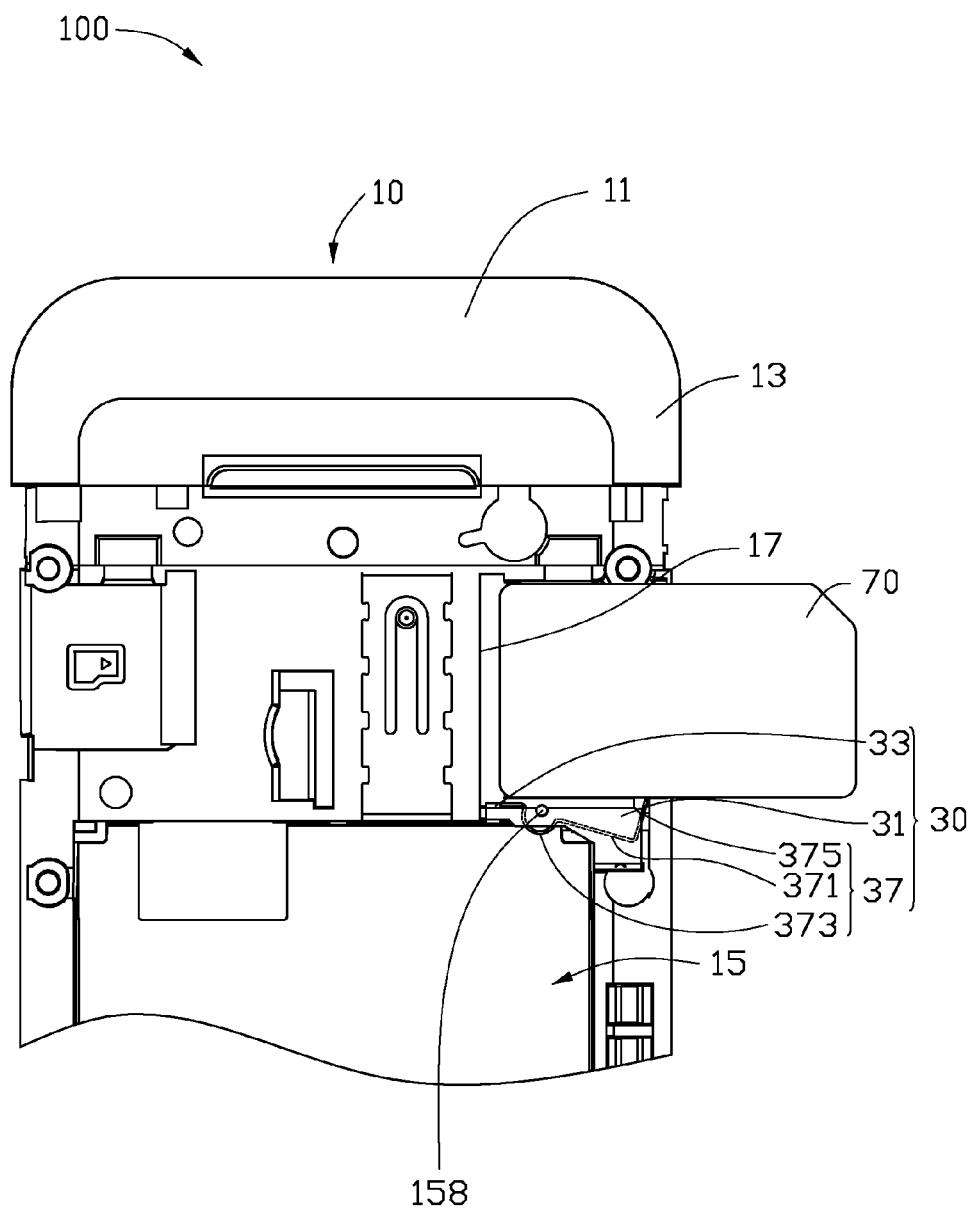
FIG. 5 is a top view of the portable electronic device, with the storage card released and ejected from the storage card bay of the portable electronic device of FIG. 1.

As shown in FIG. 4 and FIG. 5, during assembly of the portable electronic device 100, the storage card lock 30 is mounted on the main body 10. The body portion 31 of the storage card lock 30 covers the gap 157 of the second sidewall 155. The two latching arms 33 of the latching end 311 engage/ latch the latching portion 159 of the second sidewall 155 tightly, and the fixing portion 35 latches the latching slot 154 of the main body 10 correspondingly. The positioning post 158 of the second sidewall 155 penetrates and is accommodated within the notch 318 of the body portion 31 correspondingly. The elastic lock piece 37 is received within the gap 157, and the curved releasing portion 373 is partially accommodated within the battery bay 15. The storage card 70 is received through the access opening 173 of the main body 10 and accommodated in the storage card bay 17. The battery 50 is received in the battery bay 15 to impel the releasing portion 373 toward the access opening 173. Thus, the releasing portion 373 of the storage card lock 30 is locked in front of the access opening 173 of the storage card bay 17.

To effect removal of storage card 70 from the storage card bay 17, the battery 50 is detached from the battery bay and the releasing portion 373 of the storage card lock 30 is automatically released to return to its original position, being partially accommodated within the battery bay 15 to expose the inset opening 173. The storage card 70 can then be easily removed.

The exemplary storage card lock 30 is detachably mounted on the main body 10 of the portable electronic device 100 beside the access opening 173 of the storage card bay 17, has a simple structure and is easily operated. The storage card lock 30 is configured to be controlled by the battery 50 received in the battery bay 15, being locked in front of the access opening 173 of the storage card bay 17 during connection or received within the battery bay 15. The portable electronic device 100 having the storage card lock 30 retains installation of storage card 70 in storage card bay 17 during operation.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A storage card lock mounted in a portable electronic device for fixing and releasing a storage card received therein, comprising:
   a body portion comprising a latching end and an opposite fixing end;
   a latching portion disposed at the latching end of the body portion for latching to the portable electronic device; and
   an elastic lock piece extending and bending from the latching portion of the body portion toward the fixing end for elastically fixing and releasing the storage card.

2. The storage card lock as claimed in claim 1, wherein the latching portion comprises two latching arms extending outward from the two sides of the latching end respectively and bending toward each other; the storage card lock further including a fixing portion extending outward from the fixing end of the body portion and bending toward the two latching arms side.

3. The storage card lock as claimed in claim 2, wherein the body portion is substantially L-shaped; and the fixing portion is substantially rectangular and parallel to the two latching arms.

4. The storage card lock as claimed in claim 2, wherein the elastic lock piece is substantially L-shaped and includes an elastic releasing body and a lock portion; the elastic releasing body extends outward from the latching arm of the latching end; and the lock portion is substantially rectangular and disposed at the distal end of the elastic releasing body.

5. The storage card lock as claimed in claim 4, wherein the elastic releasing body defines a curved releasing portion adjacent to the latching arm.

6. The storage card lock as claimed in claim 4, wherein the lock portion extends from the distal end of the elastic releasing body and is bent away from the fixing portion and perpendicular to the releasing body.

7. The storage card lock as claimed in claim 1, wherein the storage card lock is a punched and bent sheet of metallic material.

8. The storage card lock as claimed in claim 1, wherein the body portion defines a notch therethrough adjacent to the latching end and the edge thereof.

9. A storage card lock comprising:
   a body portion comprising a latching end and an opposite fixing end;
   two latching arms disposed parallel at the two sides of the latching end respectively;
   a fixing portion disposed at the fixing end of the body portion and bending toward and parallel to the two latching arms; and
   an elastic lock piece extending and bending from the latching portion of the body portion toward the fixing end.

10. A portable electronic device comprising:
    a main body defining a battery bay and a storage card bay disposed adjacent to the battery bay; the storage card bay comprising an access opening through which the storage card is received; and
    a storage card lock mounted on the main body and configured to be resisted by a battery in the battery bay to block the access opening of the storage card bay.

11. The portable electronic device as claimed in claim 10, wherein the main body includes an upper surface and a side portion; the battery bay is recessed in the upper surface of the main body forming a first sidewall parallel to the side portion, and a second sidewall adjacent to the storage card bay; the storage card lock includes a body portion and an elastic lock piece extending and bending from the body portion; wherein the body portion is fixed to the second side wall with the elastic lock piece partially accommodated within the battery bay and resisted by the battery to block the access opening.

12. The portable electronic device as claimed in claim 11, wherein the first sidewall adjacent to the storage card bay defines a latching slot recessed therein; the body portion includes a latching end and an opposite fixing end; and a fixing portion disposed at the fixing end of the body portion and fixedly latching the corresponding latching slot.

13. The portable electronic device as claimed in claim 12, wherein the second sidewall defines a gap therethrough adjacent to the latching slot for communicating with the storage card bay; the elastic lock piece includes an elastic releasing body extending from the latching end and a lock portion disposed at the distal end of the elastic releasing body; wherein the body portion covers the gap of the second sidewall; and the elastic releasing body is partially accommodated within the battery bay and impelled by the battery to move within the gap.

14. The portable electronic device as claimed in claim 10, wherein the two sides of the second sidewall adjacent to the gap are recessed toward each other to form a latching portion; the storage card lock further includes two latching arms extending outward from the two sides of the latching end and bending toward each other; and the two latching arms engage/latch the latching portion of the second sidewall tightly correspondingly.

15. The portable electronic device as claimed in claim 10, wherein the body portion defines a notch therethrough; the elastic releasing body defines a curved releasing portion corresponding to the notch; the main body is a back shell and includes a positioning post disposed within the gap; and the positioning post is surrounded by the releasing portion and penetrates the notch to locate the storage card lock.

* * * * *